United States Patent
Griffin, Jr.

(10) Patent No.: US 8,072,183 B2
(45) Date of Patent: Dec. 6, 2011

(54) MULTIPLE INTERFACE DEVICE CHARGER WITH REMOVABLE BATTERY PACK

(75) Inventor: Paul P. Griffin, Jr., Nashville, TN (US)

(73) Assignee: Griffin Technology, Inc., Nashville, TN (US)

( * ) Notice: Subject to any disclaimer, the term of this patent is extended or adjusted under 35 U.S.C. 154(b) by 446 days.

(21) Appl. No.: 12/402,500

(22) Filed: Mar. 12, 2009

(65) Prior Publication Data

US 2010/0231165 A1 Sep. 16, 2010

(51) Int. Cl.
*H02J 7/00* (2006.01)

(52) U.S. Cl. ........ 320/107; 320/106; 320/112; 320/113; 320/115

(58) Field of Classification Search .................... 320/107
See application file for complete search history.

(56) References Cited

U.S. PATENT DOCUMENTS

| | | | |
|---|---|---|---|
| 7,638,970 B1 * | 12/2009 | Gebhard et al. | 320/113 |
| 2006/0267547 A1 * | 11/2006 | Godovich | 320/107 |
| 2008/0231233 A1 * | 9/2008 | Thornton | 320/137 |

* cited by examiner

*Primary Examiner* — M'Baye Diao
(74) *Attorney, Agent, or Firm* — Jason L. Hornkohl; Hornkohll Intellectual Property Law PLLC

(57) ABSTRACT

A charging accessory for a portable electronic device having a device input connector includes a main charger body portion having a power supply connection to an AC wall outlet that receives an AC power supply voltage. Power conversion circuitry converts the AC power supply voltage to a DC power supply voltage. A device connector is electrically coupled to the DC power supply voltage and configured to couple the DC power supply voltage to the device input connector of the portable electronic device. The main body also has a battery pack connector that is electrically coupled to the DC power supply voltage. The battery pack connector couples to a battery pack through a charging body connector that electrically connects to the battery pack connector and receives the DC power supply voltage when the battery pack is mounted on the main charger body portion. A rechargeable battery in the battery receives the DC power supply voltage to recharge the rechargeable battery. A device connector allows the battery pack to be directly coupled to the device input connector on the portable electronic device to provide an addition portable power supply for the device.

20 Claims, 5 Drawing Sheets

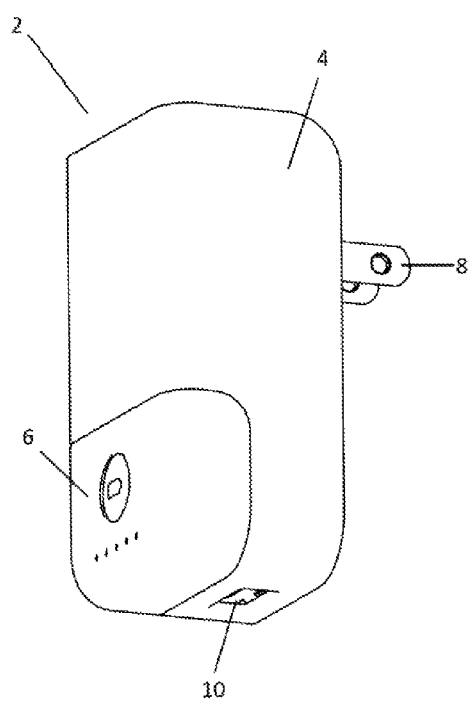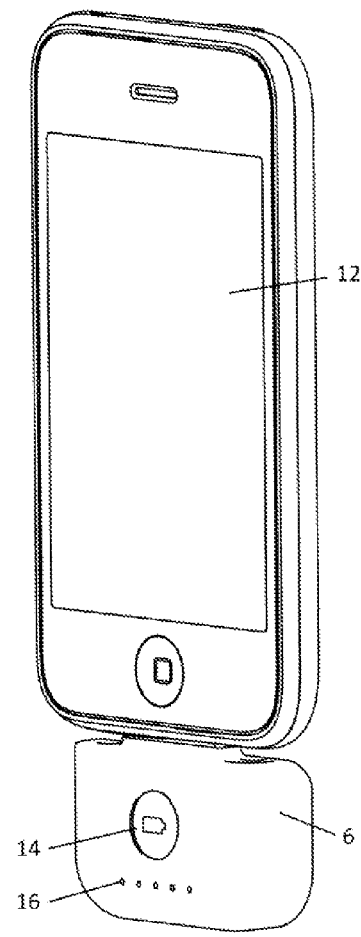
FIG. 1A
FIG. 1B

MULTIPLE INTERFACE DEVICE CHARGER WITH REMOVABLE BATTERY PACK

CROSS-REFERENCES TO RELATED APPLICATIONS

Not Applicable.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Chargers for portable electronic devices are well known devices that condition power received from a power supply into the form needed by a particular device. These chargers typically have a voltage converter that converts an AC wall voltage into a DC voltage required to charge the device. Battery packs that can be coupled to a portable electronic device to charge the device when no connection to a wall outlet is available are also known. Unfortunately, these battery packs either use disposable batteries, or have rechargeable batteries that require a different charger than the portable device for which the battery pack is designed. In addition, many chargers involve clumsy cables and ascetically unpleasing designs.

In light of the above discussed problems with the prior art, what is needed is an improved charger that can charge a portable device and provide an additional portable power supply for the device.

BRIEF SUMMARY OF THE INVENTION

The present invention is directed toward a charging accessory for a portable electronic device having a device input connector. The accessory includes a main charger body portion that has a power supply connection to an AC wall outlet that receives an AC power supply voltage. Power conversion circuitry converts the AC power supply voltage to a DC power supply voltage. A device connector is electrically coupled to the DC power supply voltage and configured to couple the DC power supply voltage to the device input connector of the portable electronic device, preferably through a cable having a connector that couples to the device input connector. A battery pack connector is also electrically coupled to the DC power supply voltage.

The charging accessory further includes a battery pack that has a charging body connector that electrically connects to the battery pack connector on the main body portion and receives the DC power supply voltage when the battery pack is mounted on the main charger body portion in a battery pack mounting cavity. The charging body connector and battery pack connector preferably are pairs of mating electrical contacts. A rechargeable battery in the battery pack receives the DC power supply voltage to recharge the rechargeable battery. The battery pack includes a battery level display that indicates a charge level of the rechargeable battery. A device connector allows the battery pack to be directly coupled to the device input connector on the portable electronic device such that the rechargeable battery provides power to the portable electronic device and the device and battery can be carried as a single unit. The accessory includes power conditioning circuitry for altering a voltage or current level of the DC power supply and battery voltage to the particular voltage or current parameters of the device for which the accessory is designed.

The housing of the battery pack and the housing of the main body portion preferably form a substantially six sided polygon when coupled together in a charging position. The accessory also preferably includes a first magnetic member positioned in the main charger body and a second magnetic member positioned in the battery pack such that the battery pack is magnetically held in the battery pack mounting cavity in the charging position.

The present invention is also directed towards a charging accessory for a portable electronic device that has a main body portion that includes a 12-volt outlet adapter body that receives a 12-volt power supply voltage when inserted into a 12-volt outlet. Power conversion circuitry converts the 12-volt power supply voltage to a charging voltage. A pair of charger body charging contacts are electrically coupled to the charging voltage. A device connector on the main body portion is electrically coupled to the charging voltage and configured to couple the charging voltage to a device input connector of the portable electronic device. A battery pack having a pair of battery pack charging contacts electrically connects to the pair of charging contacts on the main body portion and receives the charging voltage when the battery pack is placed in a charging position. A rechargeable power supply in the battery pack receives the charging voltage as needed to recharge. A device connector allows the battery pack to be directly coupled to the device input connector on the electronic device such that the rechargeable power supply provides power to said portable electronic device. The battery pack includes an LED battery level display that indicates a charge level of the rechargeable power supply. The battery pack is preferably configured so that it can couple to both the 12-volt and 120-volt embodiments.

BRIEF DESCRIPTION OF THE SEVERAL VIEWS OF THE DRAWINGS

FIG. 1A is an illustration of a charging accessory constructed an embodiment of the present invention;

FIG. 1B is an illustration of the battery pack of the charging accessory of FIG. 1A directly coupled to a portable electronic device;

DETAILED DESCRIPTION OF THE INVENTION

Figure 2:
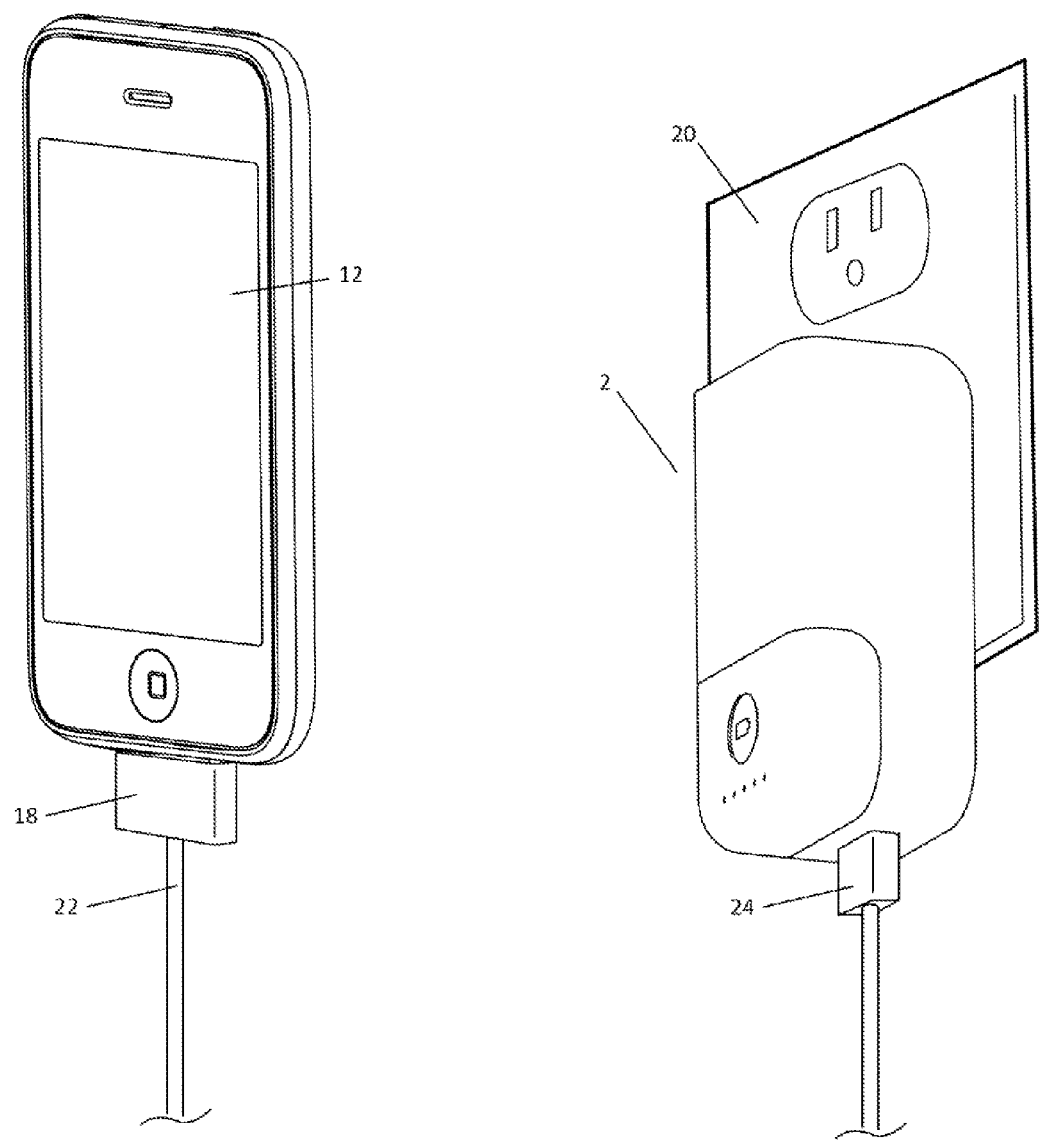
FIG. 2 is an illustration of the charging accessory of FIG. 1 coupled to a wall outlet and a portable electronic device.

The present invention is an improved charger that provides a wireless backup power supply for a portable electronic device. Referring now to FIG. 1A, an illustration of a charging accessory constructed in accordance with an embodiment of the present invention is shown. The charging accessory 2 has a main charger body 4 and a removable battery pack 6 that electrically and physically couples to the main body portion 4. When coupled together, the housings of the main charger body 4 and the battery pack 6 form a unitary unit having an elongated cube shape. The main charger body 4 has standard wall outlet prongs 8 for coupling with a wall outlet and a cable connector 10. The cable connector 10 allows the main charger body 4 to be connected to a portable electronic device 12 such that the main charger body can charge the device as discussed in more detail below with respect to FIG. 2.

The removable battery pack 6 has a battery testing button 14 and battery level display 16. The battery level display 16 consists of five LED lights. The number of LEDs lit when the button 14 is pressed corresponds to the remaining charge in the battery pack. While LEDs 16 and a button 14 are used in the embodiment shown, any type of suitable display and user input can be used.

As shown in FIG. 1B, the removable battery pack 6 can be disconnected from the main charger body 4 and coupled directly to the portable electronic device 12. Thus, the battery pack 6 functions as a portable power supply that can be charged by the same charger 4 as the device 12 at the same time. This reduces the number of components required to perform these functions and decreases the complexity of maintaining separate chargers for the battery pack 6 and device 12.

As shown in FIG. 2, the accessory 2 can be coupled to a standard wall outlet 20 to simultaneously recharge the battery pack 6 and the portable electronic device 12. When the accessory 2 is coupled to wall power and the battery pack 6 is coupled to the main body portion 4, charging circuitry in the main charger body 4 charges the battery pack 6. In addition, a cable 22 having connectors 18 and 24 that respectively mate with connectors on the main charger body 4 and portable electronic device 12 allow the main charger body 4 to recharge the power supply of the portable electronic device 12.

Figure 3:
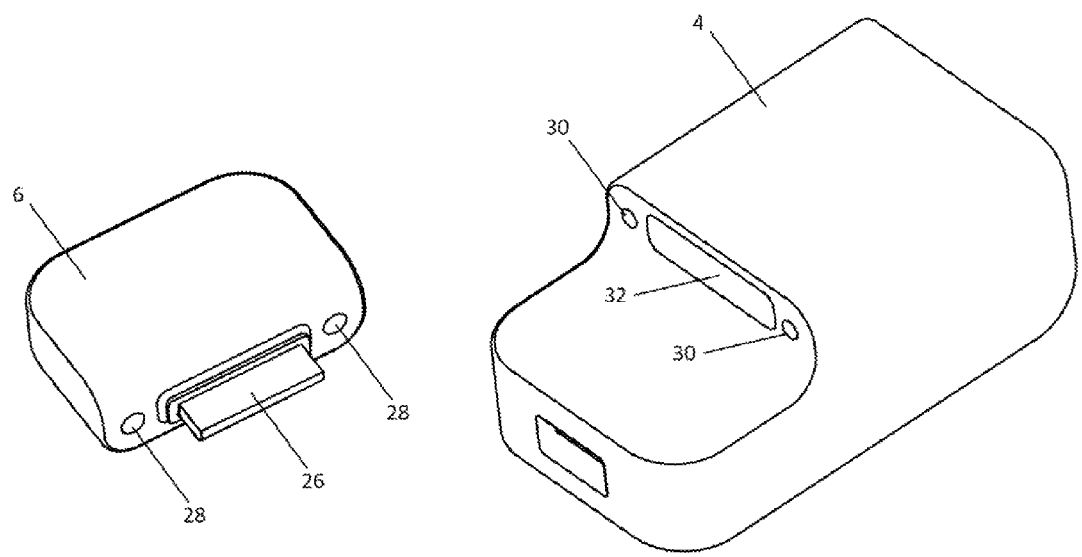
FIG. 3 is an illustration of the charging accessory of FIG. 1 having the battery module removed.

As shown in FIG. 3, the battery pack 6 has a connector 26 that is adapted to directly mate with a connector on the portable electronic device. The battery pack 6 also has charging contacts 28 that mate with corresponding charging contacts 30 on the main body portion 4 of the charging accessory when the battery pack 6 is positioned for charging. The main body portion 4 preferably has a cavity 32 that receives the device connector 26 when the battery pack 6 is mounted on the main body portion 4. The use of charging contacts 28 and 30 to charge the battery pack 6 instead of a full connector configured to mate with the connector 26 is preferred to decrease the cost of the accessory and increase the easy with which the battery pack can be coupled to the main body portion. In the embodiment shown, corresponding magnetic members contained internally in the battery pack 6 and main body portion 4 act to hold the battery pack in position with respect to the main body portion 4 and charging contacts 28 and 30 when being charged as discussed in more detail below with respect to FIG. 5.

Figure 4:
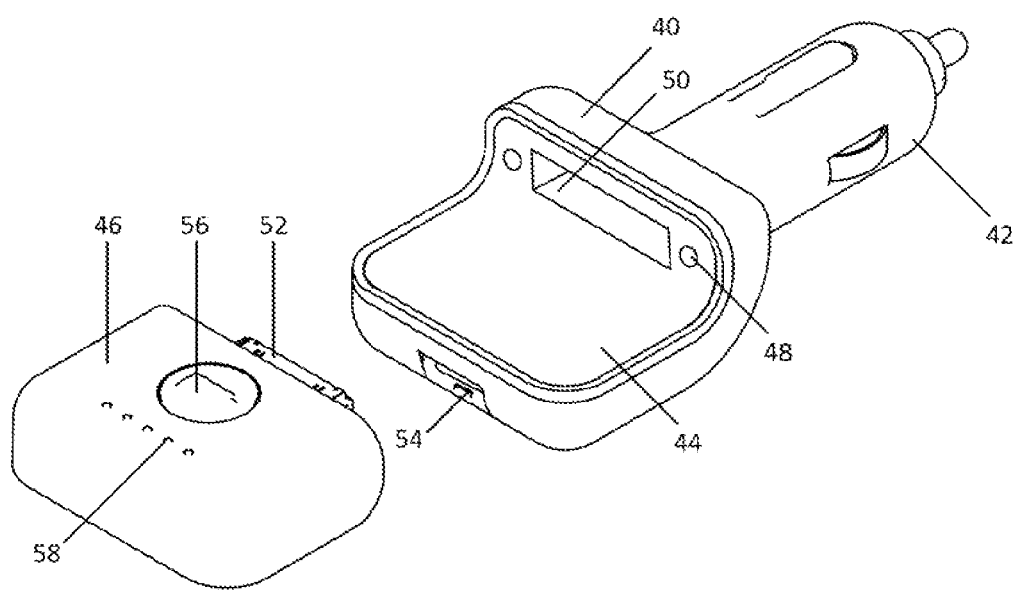
FIG. 4 is an illustration of an alternative embodiment of the present invention adapted to be coupled to a 12-volt outlet.

The present invention can also be constructed with the main body portion adapted to fit in a 12-volt outlet as shown in FIG. 4. The embodiment has a main body portion 40 with an adapter body extension 42 that is adapted mate with a 12-volt outlet. Like the embodiment of FIG. 1, the main body portion 40 has a battery mounting portion 44 that receives the battery pack 46. The battery mounting portion 44 has charging contacts 48 and a cavity 50 for receiving the device connector 52 on the battery pack 46. The battery pack 46 has a battery testing button 56 and display 58 that can be used to determine the power level of the battery in the battery pack 46. The battery pack 46 is preferably designed such that the same battery pack 46 can be used interchangeably with either the main body portion 4 or 40 of FIG. 1 or FIG. 4.

Figure 5:
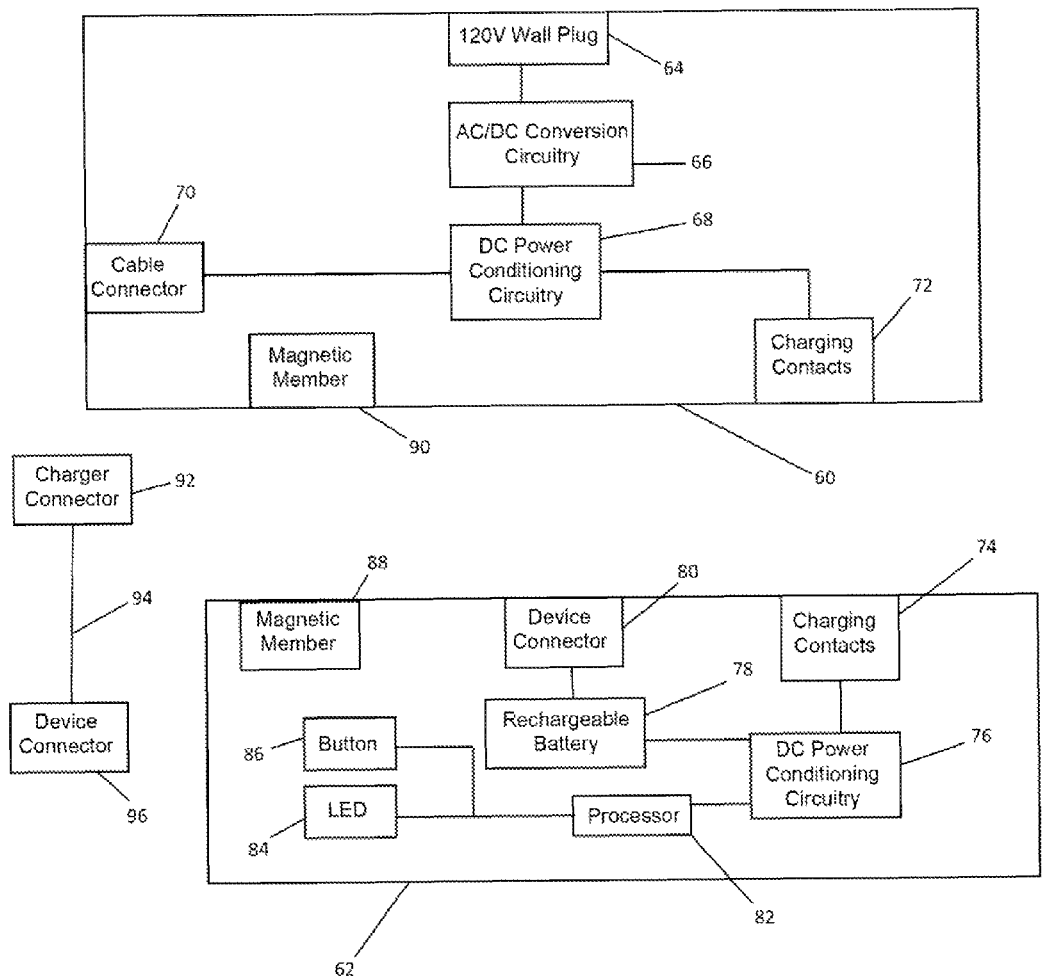
FIG. 5 is a functional block diagram of the embodiment of FIG. 1.

Referring now to FIG. 5, a functional block diagram of a main body portion 60 and battery pack 62 constructed in accordance with an embodiment of the present invention. The main body portion 60 has a 120V power supply connection 64 adapted to receive a standard wall current. As discussed above, the main body portion 60 can also have a 12-volt power supply connection. Alternating to direct current conversion circuitry 66 converts the alternating wall current to a DC voltage. Power conditioning circuitry 68 conditions the DC voltage to the proper parameters required by the battery pack 62 and the device to be charged. The conditioned DC voltage is provided to the cable connector 70 and the charging contacts 72 of the main body portion 60.

The cable connector 70 is selected to couple to a charger connector 92 that is connected through a cable 94 to a device connector 96. The device connector 96 is selected to connect to corresponding connector on a portable electronic device. The cable assembly 92, 94 and 96 functions to deliver a charging or power supply voltage from the main body portion 60 to the selected portable electronic device. The particular connectors 70, 80, 92, and 96 used depend upon the connectors for the type of device which the charger is designed for use with. In the preferred embodiment, the device connector 96 is a 30 pin connector and the cable connector 70 and charger connector 92 are USB connectors.

The battery pack 62 includes charging contacts 74 that receive DC power from the charging contacts 72 of the main body portion 60 when the battery pack 62 is coupled to the main body portion 60 for charging. In an alternative embodiment, a device type connector 80 could be used to couple the battery pack 62 to the main body portion 60. However, in practice, the device connector 80 is usually a complicated, expensive, and proprietary, connector that contains far more contacts than are necessary to transfer power from the main body portion 60 to the battery pack 62. Thus, the use of simple charging contacts 72 and 74 results in a more cost effective and reliable design. The DC power from the charging contacts 74 is provided to additional power conditioning circuitry 76 that conditions the DC voltage to the proper parameters for charging the battery 78 or providing power from the battery 78 to the device connector 80. The particular power conditioning circuitry 76 required will depend upon the particular device and battery for which the charger is designed. The battery pack 62 also includes a processor 82 which controls and monitors the LED 84 display and power level button 86.

As discussed above, the battery pack 62 is preferably held on the main body portion 60 by corresponding magnetic members 88 and 90 positioned in the battery pack and the main body portion. The magnetic members 88 and 90 can both be magnets or, one can be a magnet and one a ferromagnetic metal. If multiple magnets are used, the polarity of the magnets can be selected to insure proper alignment with the corresponding magnet.

What is claimed is:

1. A charging accessory for a portable electronic device having a device input connector, said accessory comprising:
   a main charger body portion comprising:
   a power supply connection to an AC wall outlet that receives an AC power supply voltage;
   power conversion circuitry that converts the AC power supply voltage to a DC power supply voltage;
   a device connector that is electrically coupled to the DC power supply voltage and configured to couple the DC power supply voltage to the device input connector of the portable electronic device;
   a battery pack connector that is electrically coupled to the DC power supply voltage; and a battery pack comprising:
  a charging body connector that electrically connects to the battery pack connector and receives the DC power supply voltage when the battery pack is mounted on the main charger body portion,
  a rechargeable battery that receives the DC power supply voltage to recharge the rechargeable battery; and
  a device connector that allows said battery pack to be coupled to the device input connector on said portable electronic device such that said rechargeable battery provides power to said portable electronic device.

2. The charging accessory of claim 1 further comprising power conditioning circuitry for altering a voltage or current level of the DC power supply voltage.

3. The charging accessory of claim 1 wherein said main charger body portion further comprises a battery pack mounting cavity.

4. The charging accessory of claim 1 wherein said battery pack further comprises a battery level display that indicates a charge level of the rechargeable battery.

5. The charging accessory of claim 1 further comprising a first magnetic member positioned in the main charger body and a second magnetic member positioned in the battery pack such that said battery pack is magnetically held against said main charger body in a charging position.

6. The charging accessory of claim 1 wherein the device connector on the main charger body further comprises a cable having a connector that couples to the device input connector of the portable electronic device.

7. The charging accessory of claim 1 wherein the charger body connector on the battery pack consists solely of a first and second charging contact.

8. A charging accessory for an electronic device having a device input connector, said accessory comprising:
  a main body portion comprising:
    a power supply connection to an external AC power supply AC that receives an AC power supply voltage;
    power conversion circuitry that converts the AC power supply voltage to a DC power supply voltage;
    a pair of charger body charging contacts that are electrically coupled to the DC power supply voltage; and
  a battery pack comprising:
    a pair of battery pack charging contacts that electrically connects to the pair of charging contacts and receives the DC power supply voltage,
    a rechargeable power supply that receives the DC power supply voltage to recharge the rechargeable power supply; and
    a device connector that allows said battery pack to be coupled to the device input connector on said electronic device such that said rechargeable battery provides power to said portable electronic device and said portable electronic device and said coupled battery pack can be portably carried as a single unit.

9. The charging accessory of claim 8 wherein the main body portion further comprises a device connector that is electrically coupled to the DC power supply voltage and configured to couple the DC power supply voltage to the device input connector of the portable electronic device.

10. The charging accessory of claim 8 wherein a housing of said battery pack and a housing of said main body portion form a substantially six sided polygon when coupled together in a charging position.

11. The charging accessory of claim 8 further comprising a first magnetic member positioned in the main body portion and a second magnetic member positioned in the battery pack such that said battery pack is magnetically held against said main charger body in a charging position.

12. The charging accessory of claim 11 wherein a polarity of said magnetic members is selected to insure proper alignment of said charging contacts when said battery pack is coupled to said main body portion.

13. The charging accessory of claim 8 wherein said battery pack further comprises a LED battery level display that indicates a charge level of the rechargeable power supply.

14. The charging accessory of claim 8 further comprising a second charging portion that couples to a 12-volt outlet wherein the second charging portion receives power from the 12-volt outlet and provides conditioned power to a pair of charging contacts and wherein said second charging portion has a mounting portion for receiving said battery pack such that said second charging portion can recharge said battery pack.

15. A charging accessory for a portable electronic device having a device input connector, said accessory comprising:
  a main body portion comprising:
    a 12-volt outlet adapter body that receives a 12-volt power supply voltage when inserted into a 12-volt outlet;
    power conversion circuitry that converts the 12-volt power supply voltage to a charging voltage;
    a pair of charger body charging contacts that are electrically coupled to the charging voltage; and
    a device connector that is electrically coupled to the charging voltage and configured to couple the charging voltage to the device input connector of the portable electronic device; and
  a battery pack comprising:
    a pair of battery pack charging contacts that electrically connects to the pair of charging contacts and receives the charging voltage,
    a rechargeable power supply that receives the charging voltage to recharge; and
    a device connector that allows said battery pack to be directly coupled to the device input connector on said electronic device such that said rechargeable power supply provides power to said portable electronic device.

16. The charging accessory of claim 15 further comprising a first magnetic member positioned in the main body portion and a second magnetic member positioned in the battery pack such that said battery pack is magnetically held against said main body portion in a charging position.

17. The charging accessory of claim 15 wherein said battery pack further comprises a LED battery level display that indicates a charge level of the rechargeable power supply.

18. The charging accessory of claim 8 further comprising a second charging portion that couples to a 120-volt wall outlet wherein the second charging portion receives power from the 120-volt outlet and provides conditioned power to a pair of charging contacts and wherein said second charging portion has a mounting portion for receiving said battery pack such that said second charging portion can recharge said battery pack.

19. The charging accessory of claim 15 wherein the device connector further comprises a cable.

20. The charging accessory of claim 15 wherein a housing of said main body portion has a mounting cavity that receives a housing of said battery pack such that said battery pack and said main body portion form a unitary structure when coupled together in a charging position.

* * * * *